(12) United States Patent
Prus et al.

(10) Patent No.: US 8,306,675 B2
(45) Date of Patent: Nov. 6, 2012

(54) GRAPHIC DISPLAY SYSTEM FOR ASSISTING VEHICLE OPERATORS

(76) Inventors: Robert S. Prus, Houston, TX (US); Konrad Robert Sliwowski, Houston, TX (US)

( * ) Notice: Subject to any disclaimer, the term of this patent is extended or adjusted under 35 U.S.C. 154(b) by 302 days.

(21) Appl. No.: 12/779,465

(22) Filed: May 13, 2010

(65) Prior Publication Data

US 2011/0282522 A1 Nov. 17, 2011

(51) Int. Cl.
*G05D 1/00* (2006.01)
*H04J 3/22* (2006.01)
(52) U.S. Cl. .......... 701/4; 455/414.4; 370/328; 370/466
(58) Field of Classification Search ............... 455/414.4; 370/466, 328; 701/4
See application file for complete search history.

(56) References Cited

U.S. PATENT DOCUMENTS

2007/0189328 A1* 8/2007 Judd .............................. 370/466
2008/0045198 A1* 2/2008 Bhogal et al. .............. 455/414.4
* cited by examiner

*Primary Examiner* — David H Bollinger
(74) *Attorney, Agent, or Firm* — James A. Italia; Italia IP

(57) ABSTRACT

A system for converting audible air traffic control instructions for pilots operating from an air facility to textual format. The system may comprise a processor connected to a jack of the standard pilot headset and a separate portable display screen connected to the processor. The processor may have a language converting functionality which can recognize traffic control nomenclature and display messages accordingly. Displayed text may be limited to information intended for a specific aircraft. The display may show hazardous discrepancies between authorized altitudes and headings and actual altitudes and headings. The display may be capable of correction by the user, and may utilize Global Positioning System (GPS) to obtain appropriate corrections. The system may date and time stamp communications and hold the same in memory. The system may have computer style user functions such as scrollability and operating prompts.

10 Claims, 3 Drawing Sheets

GRAPHIC DISPLAY SYSTEM FOR ASSISTING VEHICLE OPERATORS

FIELD OF THE INVENTION

The present invention relates to displays, and more particularly to displays for reproducing spoken messages as text proximate the operator of a vehicle.

BACKGROUND OF THE INVENTION

Pilots of aircraft can be burdened with many tasks, especially at the time of take-off and landing. Air traffic control (hereinafter, ATC) systems which supervise aircraft activity at airports attempt to maintain order of air traffic and to assist pilots by having air traffic controllers issue instructions to the pilots. However, in the busy environment of an aircraft cockpit, there are few provisions if any for writing down verbal instructions which have been issued to pilots by air traffic controllers.

The prior art has proposed display systems for displaying ATC information, and may be based for example on speech recognition. However, these systems lack the ability to recognize aviation jargon and to convert information based on this recognition, to discriminate between content which is relevant to any particular aircraft and content which is irrelevant, and to utilize standard pilot headsets for input signals to an audible-to-textual conversion system.

SUMMARY OF THE INVENTION

The present invention provides an automated system for converting audible information to textual information, which is then displayed on a small portable screen located near the pilot. This serves two purposes. One is that the pilot need not devote time and attention to writing down verbal instructions in order to preserve them. Also, the instructions are preserved in written format for subsequent reference, such as when they become necessary for changing flying conditions.

The system may utilize standard pilot headsets to obtain input signals for the conversion apparatus. Necessary apparatus may be limited to a data processor including a connector such as a split jack for utilizing headsets for input signals, and a small portable display device operably connected to the data processor. The display device may be supported in a location near to and convenient for the pilot of an aircraft. The display device may be battery powered and hence independent of the necessity of designing the aircraft to accommodate such a display device. Although the processor is referred to in terms of a component which may be separate from the display device, the two may be integrated if desired or may be physically separate components.

Significant functionalities contained within the processor may include a language converting functionality which can recognize traffic control nomenclature and display messages accordingly, ability to limit displayed information to that intended for a specific aircraft, and ability to show hazardous discrepancies between authorized altitudes and headings and actual altitudes and headings. The display may be capable of correction by the user, and may utilize Global Positioning System (GPS) to obtain appropriate corrections. The system may date and time stamp communications and hold the same in memory, thereby providing some functions of a flight data recorder. The system may have computer style user functions such as scrollability and operating prompts to facilitate operation by the pilot.

It is an object of the invention to provide an automatic visual display of audible information transmitted from an ATC source.

Another object of the invention is to hold transmitted information from the ATC source in memory.

A further object is to enable the pilot to manipulate the display according to his or her needs.

Still another object is to be able to automatically display warnings of hazardous flight conditions.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
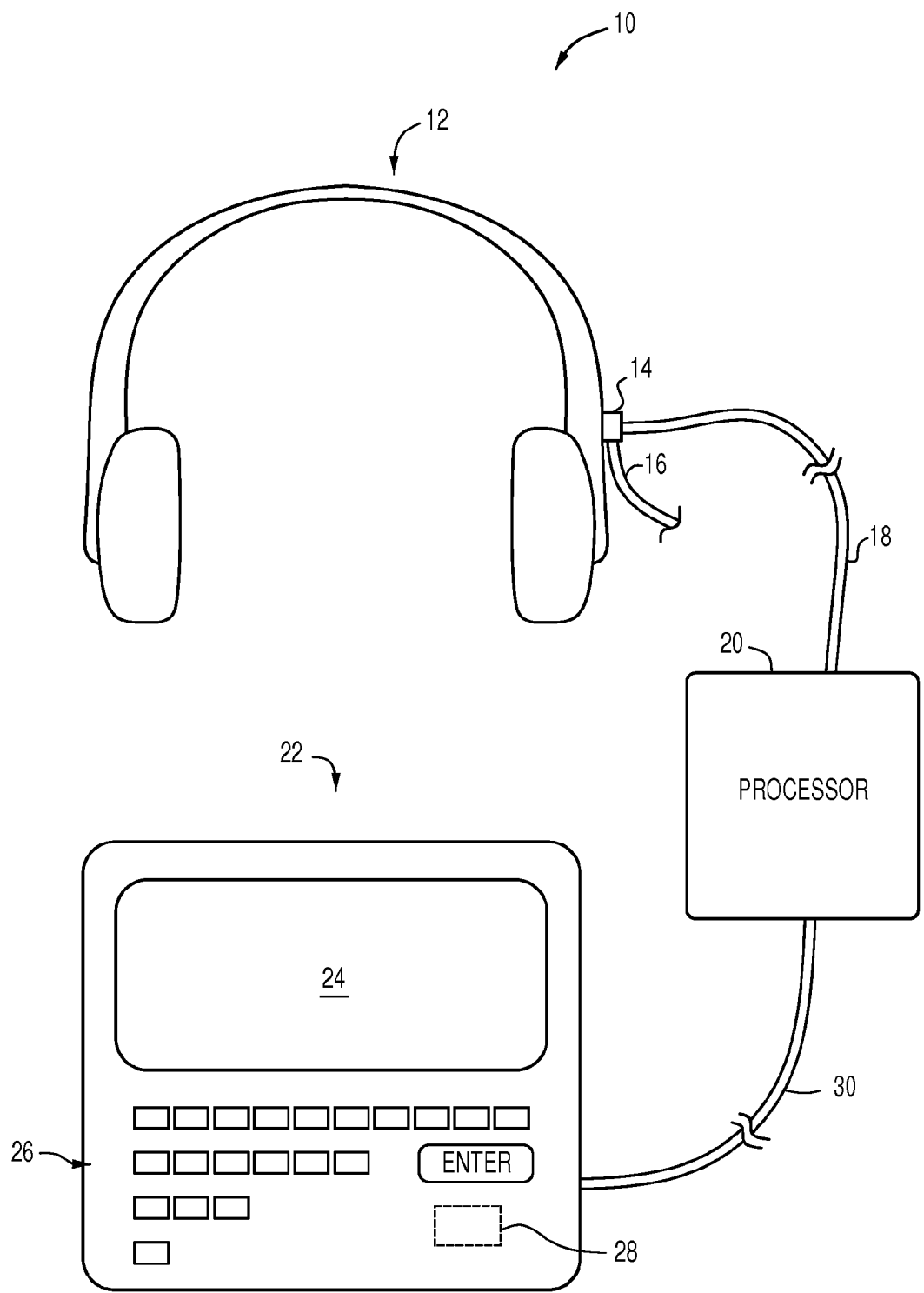
FIG. 1 is a diagrammatic representation of the physical apparatus of the inventive system, according to at least one aspect of the invention.

Referring first to FIG. 1, according to at least one aspect of the invention, there is shown system apparatus 10 for receiving verbal flight information from a remote Air Traffic Control source (ATC) (not shown) and for displaying the verbal flight information in textual format aboard an aircraft (not shown in its entirety). The system apparatus 10, which may be part of a larger system 100 which will be further described hereinafter, may include a communications device disposed to receive audible communications from the ATC. The communications device may comprise a standard pilot headset 12 having a split jack 14 for connecting to radio equipment or other communications devices (not shown) which may be standard conventional equipment of aircraft. Alternatively, the system apparatus 10 may include an independent or stand-alone radio receiver (not shown). As depicted, the split jack 14 is connected to a communications cable 16 which may transmit signals from a radio receiver (not shown) carried aboard the aircraft. The split jack 14 may also be connected to a communications cable 18 to enable simultaneous transmission of signals for generating audible messages to a data processor 20.

The data processor 20 may include voice recognition software and all apparatus necessary to convert audible communications received by the communications device (e.g., the headset 12) into textual format. The data processor 20 is functionally coupled to a display screen 22, which display screen 22 is disposed to display text corresponding to the audible communications received by the communications device. In summary, the data processor 20 may be communicably linked to the pilot headset 12 such that audible inputs originating from the ATC system and which are transmitted to the pilot headset 12 provide the audible communications being displayed in textual format on the display screen 22.

It should be mentioned at this point that while the system apparatus 10 is depicted as utilizing communications cables 16 and 18, either or both of the communications cables 16 and 18 may be replaced by wireless links if desired.

The display screen 22 is relatively small and portable. For example, the display screen 22 may have a viewable field 24 of dimensions limited to six inches in height and six inches in width. The viewable field 24 may be three inches by two inches, for example. The display screen may include a keyboard 26 disposed adjacent the viewable field 24. The display screen 22 may be battery powered by an onboard battery 28 connected to its electrically powered components (not separately shown).

The display screen 22 may be a discrete component unto itself, separate and apart from the processor 20, and connected thereto by a communications cable 30 (or alternatively, by a wireless link, not shown). As an alternative, the processor 20 may be integrated into the display screen 22 (this embodiment is not shown).

Figure 2:
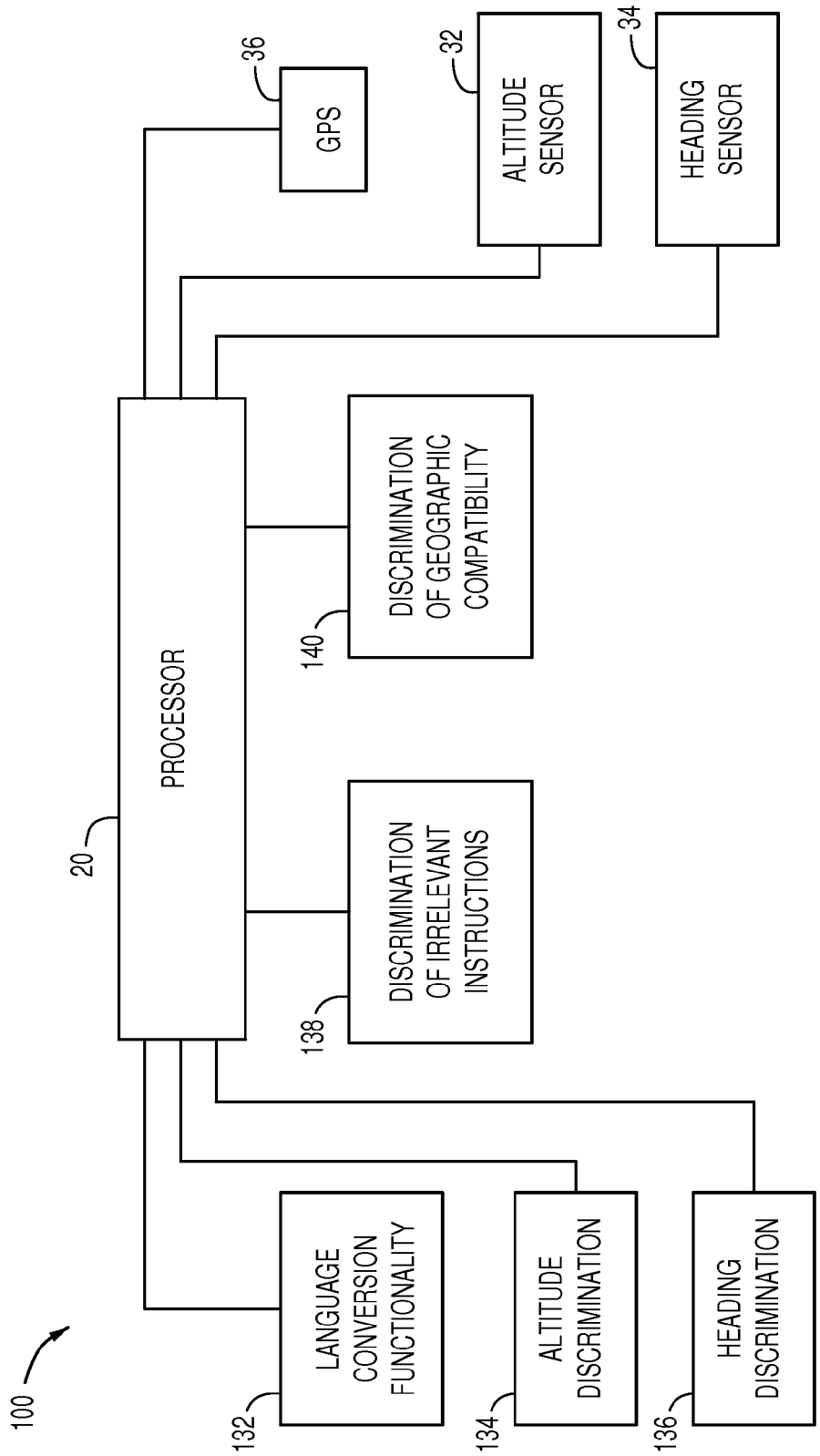
FIG. 2 is a block diagram showing informational inputs to the inventive system, and outputs which result from processing of data corresponding to the informational inputs.

As shown in FIG. 2, the system apparatus 10 may have certain functionalities. As employed herein, functionality signifies that the system apparatus 10 has all necessary supporting hardware, software, firmware, and other amenities to assure operation as described, even though some of the supporting amenities such as software does not lend themselves to literal depiction.

The invention may be thought of as a system 100 which incorporates not only the system apparatus 10 shown in FIG. 1, but also apparatus which may be part of the aircraft, part of ground facilities, communications signals, and other components, all of which work together to enable the system apparatus 10 to generate the displays and functions set forth herein.

The system 100 may have a language converting functionality 132 which stores and can recognize traffic control nomenclature, and can convert or translate traffic control nomenclature to other forms. Examples of traffic control nomenclature include for example an alphanumeric aircraft call sign, and conventional expansions of letters and numbers. As employed herein, an expansion of a letter signifies that the speaker voices a word starting with the selected letter, rather than voicing the letter itself. Illustratively, the letter "M" is easily confused with the letter "N" when either is spoken. To eliminate confusion, a speaker may elect to speak a widely used, immediately recognizable word having the selected letter as the initial letter of the recognizable word. Alternatively stated, in place of speaking a letter, the speaker speaks a word starting with the desired letter.

The reverse of expansion is also possible. That is, a frequently used word may be abbreviated to its initial letter when spoken.

Either expansion or contraction of the intended message may form conventional elements of communication in air traffic control. The language conversion functionality 132 has conventional elements of ATC jargon or nomenclature loaded into memory and available for processing in any suitable way, such as comprising look-up tables, as well as known speech recognition programming. The language conversion functionality 132 hence has the ability to recognize conventional ATC terms, and to display appropriate text on the display screen 22 responsively to receiving and deciphering spoken content from the ATC source.

The following is a hypothetical example of a verbal transmission which may be issued by an ATC source: "N 927 SA: cleared to KEFD via VASPY intersection. After departure fly runway heading then turn right to 255. Climb and maintain 4000. Contact Departure on 133.57 Squak 3520". The language conversion functionality 132 may contain any conventional terms which may be used by the ATC source and use speech recognition software to recognize the conventional term, which may then be displayed in the intended form. For example, the first term occurring in the above example, i.e., the letter "N", may possibly have been rendered as a word or name starting with "N", such as "November". The language conversion functionality has the ability to recognize the intended term and to display the intended term in its intended format (i.e., the letter "N") despite the fact that the ATC announcer may have spoken the name "November".

The system 100 may comprise a feature or functionality 134 operable to visually indicate on the display screen 22 a discrepancy between an altitude assigned by the ATC system and the altitude sensed by Global Positioning System 36. Of course, data corresponding to the altitude may be derived from an onboard instrument or aircraft computer (neither shown) in place of the Global Positioning System 36. The processor 20 may have software for identifying assigned altitude based on the voice recognition software and software for comparing sensed altitude to assigned altitude, and for generating a warning message on the display screen 22. The warning message could comprise a message such as "Altitude Warning", or still another message. The warning message may take the form of a gauge displayed on the display screen 22, with the actual altitude visually emphasized. The selected warning message may indicate the actual altitude and the assigned altitude together for example.

Regardless of its specific nature, the warning message, where visually indicated, may utilize color coding in progressive steps. Progressive steps may take the form of selection of colors for warning text or indicia, such as green for a relatively benign condition, yellow for a more significant condition, and red for an urgent condition. Other types of visual indications may include increasing size of font or other indicia as the condition assumes greater urgency, or incorporation of a more dynamic visual effect such as blinking, flashing of supplementary warning indicia, or the like.

The system 100 may comprise a feature or functionality 136 operable to visually indicate on the display screen a discrepancy between a heading assigned by the ATC system and the heading sensed by Global Positioning System 36. Data corresponding to the heading may be derived from an onboard instrument or aircraft computer (neither shown) in place of the Global Positioning System 36. The processor 20 may have software for identifying heading based on the voice recognition software and software for comparing sensed heading to assigned heading, and for generating a warning message on the display screen 22. The warning message may have the essential observable or audible attributes of that relating to altitude, including those relating to progressive steps and color coding.

The system 100 may have a functionality 138 of discriminating or identifying ATC instructions which are irrelevant to the aircraft using the system 100. It will be appreciated that ATC systems are intended to manage a plurality of aircraft arriving at or departing from an air facility, so that many transmitted ATC messages are intended for other aircraft. One of the informational or directive messages originating from the ATC source may involve navigational fixes which do not pertain to the current flight, that being the flight of the aircraft using the system 100. The system 100 may comprise a Global Positioning System enabled data source 36. The processor 20 may be functionally linked to the Global Positioning System enabled data source 36 and may have programming which compares navigational characteristics of the current flight to those mentioned in ATC transmissions, and may suppress instructions which clearly do not correlate to navigational characteristics of the current flight. Therefore, searching for navigational fixes which do not pertain to the current flight may be eliminated.

Inputs from the Global Positioning System enabled data source 36 may also be utilized to present proposed corrections which are restricted to those which are geographically compatible with the current flight. Global Positioning System location data may be entered into the processor 20 and compared to existing flight plan data which may include current flight conditions such as existing or current altitude and heading. Discrepancies arising from this comparison may generate appropriate proposed corrections, represented in FIG. 2 as block 140.

The data processor 20 may have some generally conventional abilities of computers. An example is that the content of incoming audible communications from the ATC source may be stored in memory. Also, the data processor 20 may have programming which applies date and time stamping to incoming audible communications and maintains date and time stamped content of incoming audible communications in memory. Another generally conventional ability of computers or functionality which may be implemented is that of scrolling through scrolling through displayed text at the discretion of the operator.

It should be mentioned at this point that ability to hold the content of ATC communications in memory enables the system 100 to provide the function of a flight data recorder, even if to a limited extent.

Figure 3:
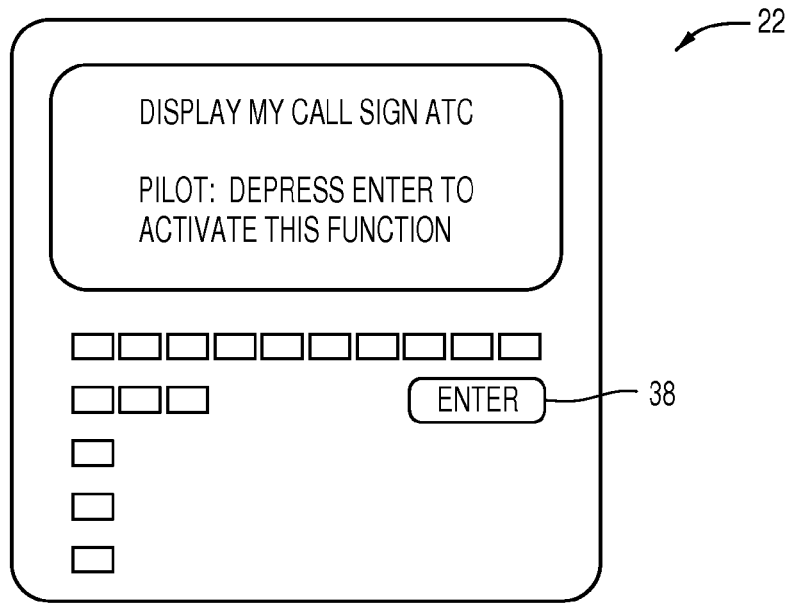
FIG. 3 is a plan view of a display screen shown in FIG. 1, further showing textual indicia which is intended to be used by a pilot to make a choice in controlling aspects of the novel system.

FIG. 3 shows a further feature of the invention, which illustrates a functionality of displaying prompts which offer selections for controlling selection of incoming ATC system information for displaying, including one option to display the call sign of the aircraft undertaking the current flight. The text displayed on the display screen 22 may present an option, in this case, that illustrated in FIG. 3 being the option to display a call sign. Additional text or indicia may present an instruction for activating the presented option. In the illustrated example, the pilot must depress the "Enter" key 38 to accept or activate the displayed option.

A further option, which may utilize a similar scheme of presenting an option and a procedure for activating the option, is that of accepting for display on the display screen 22 all ATC messages. However, a pilot may prefer to record and display only those ATC system messages which are pertinent to his or her current flight. Therefore, an additional option may be that of restricting displayed incoming ATC system information to that directed to a designated call sign, such as the call sign which has been designated for display. The selected call sign may be held in memory within the processor 20, or may be manually entered by the pilot for use during the current flight by additional prompts (not explicitly shown, but which would utilize a procedure of prompts and activation similar to that for displaying the call sign). The option to enter a call sign may include an option to enter plural call signs. For example, a pilot may wish to monitor instructions to other flights with which he or she is associated. This may come into play for example where a plurality of aircraft are departing the same air facility and are to arrive at a common destination.

Selecting one or plural specific call signs may therefore be used to activate a functionality of displaying prompts which offer an option to display all ATC system messages, and alternatively another option to restrict displayed incoming ATC system information to that directed to a designated call sign.

It will be recalled that the language conversion functionality 132 may be used to enable the system 100 to recognize a call sign spoken by an ATC source, so that the recognized call sign serves as an audible identification code which may correlate to that entered by the pilot into the system. The functionality of limiting inputs to the display screen 22 to those directed to the entered identification code may thus be implemented.

Figure 4:
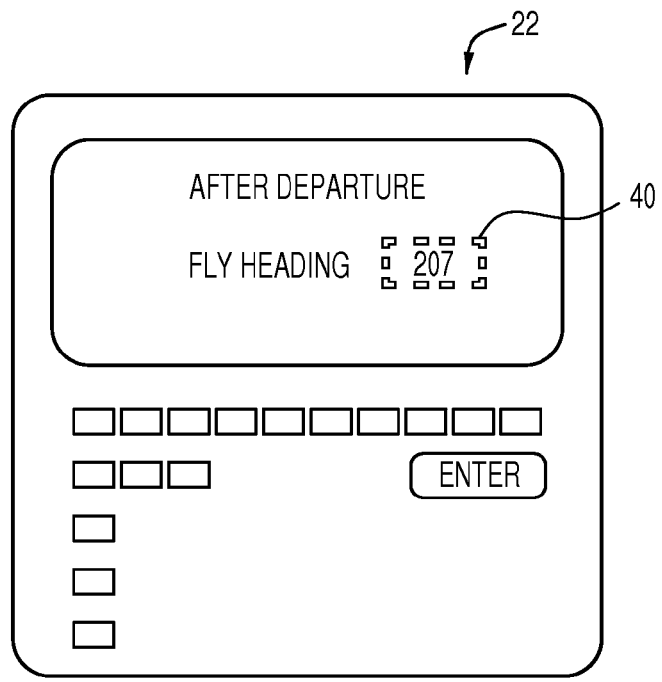
FIG. 4 is a plan view of the display screen shown in FIG. 1, further showing textual indicia illustrating a feature which may be invoked to enter corrections or changes to displayed textual indicia.

FIG. 4 shows a further control functionality which may be provided by the system 100, namely, a functionality to enter a correction to displayed audible communications content. In an example, a partial instruction is illustrated as being displayed as text on the display screen 22 in FIG. 4. The pilot may be provided with the ability to correct an error as he is listening using the headset 12 to the audible instructions correlating to the displayed text. A graphic device such as a box 40 may be caused to appear over a portion of displayed text which is subject to correction. Illustratively, an incorrect fix may have been generated by the voice recognition software and displayed. The pilot may be provided with the ability to depress one of the operating keys 42 of the display screen 22 to generate a search by the processor 20. This search may utilize inputs from the Global Positioning System enabled device 36 to suggest one or more fixes which may then be selected by the pilot using an appropriate one of the keys 42 for entry into the revised displayed text. As an alternative, the system 100 may be provided with a microphone connected to the processor 20 (not specifically shown), so that the pilot may verbally enter a preference which is then processed by the voice recognition software to generate the revision to the displayed text.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

We claim:

1. A system for receiving verbal flight information from a remote Air Traffic Control source (ATC) and for displaying the verbal flight information in textual format, comprising:
    a communications device disposed to receive audible communications from the ATC;
    a processor disposed to convert audible communications received by the communications device into textual format;
    a display screen functionally coupled to the processor and disposed to display text corresponding to the audible communications received by the communications device; and,
    a feature operable to visually indicate on the display screen a discrepancy between an altitude assigned by the ATC system and the altitude sensed by an onboard altitude sensor or Global Positioning System.

2. The system of claim 1, wherein visual indication of a sensed discrepancy is signaled by color coding in progressive steps.

3. A system for receiving verbal flight information from a remote Air Traffic Control source (ATC) and for displaying the verbal flight information in textual format, comprising:
- a communications device disposed to receive audible communications from the ATC;
- a processor disposed to convert audible communications received by the communications device into textual format;
- a display screen functionally coupled to the processor and disposed to display text corresponding to the audible communications received by the communications device; and,
- a feature operable to visually indicate on the display screen a discrepancy between a heading assigned by the ATC system and the heading sensed by an onboard heading sensor or Global Positioning System.

4. The system of claim 3, wherein visual indication of a sensed discrepancy is signaled by color coding in progressive steps.

5. A system for receiving verbal flight information from a remote Air Traffic Control source (ATC) and for displaying the verbal flight information in textual format, comprising:
- a communications device disposed to receive audible communications from the ATC;
- a processor disposed to convert audible communications received by the communications device into textual format;
- a display screen functionally coupled to the processor and disposed to display text corresponding to the audible communications received by the communications device; and,
- a feature providing Global Positioning System location inputs and having a functionality to eliminate searching for navigational fixes which do not pertain to the current flight.

6. A system for receiving verbal flight information from a remote Air Traffic Control source (ATC) and for displaying the verbal flight information in textual format, comprising:
- a communications device disposed to receive audible communications from the ATC;
- a processor disposed to convert audible communications received by the communications device into textual format;
- a display screen functionally coupled to the processor and disposed to display text corresponding to the audible communications received by the communications device;
- a feature having a functionality to enter a correction to displayed audible communications content; and,
- a feature disposed to receive and enter Global Positioning System location data and to present proposed corrections which are restricted to those which are geographically compatible with the current flight.

7. A system for receiving verbal flight information from a remote Air Traffic Control source (ATC) and for displaying the verbal flight information in textual format, comprising:
- a communications device disposed to receive audible communications from the ATC;
- a processor disposed to convert audible communications received by the communications device into textual format;
- a display screen functionally coupled to the processor and disposed to display text corresponding to the audible communications received by the communications device;
- a feature which stores content of incoming audible communications in memory; and,
- a feature which applies date and time stamping to incoming audible communications and maintains date and time stamped content of incoming audible communications in memory.

8. A system for receiving verbal flight information from a remote Air Traffic Control source (ATC) and for displaying the verbal flight information in textual format, comprising:
- a communications device disposed to receive audible communications from the ATC;
- a processor disposed to convert audible communications received by the communications device into textual format; and,
- a display screen functionally coupled to the processor and disposed to display text corresponding to the audible communications received by the communications device, wherein the display screen is battery powered.

9. A system for receiving verbal flight information from a remote Air Traffic Control source (ATC) and for displaying the verbal flight information in textual format, comprising:
- a communications device disposed to receive audible communications from the ATC;
- a processor disposed to convert audible communications received by the communications device into textual format; and,
- a display screen functionally coupled to the processor and disposed to display text corresponding to the audible communications received by the communications device; wherein the display screen is a small screen limited to a viewable field of six inches in height and six inches in width, and includes a keyboard disposed adjacent the viewable field.

10. A system for receiving verbal flight information from a remote Air Traffic Control source (ATC) and for displaying the verbal flight information in textual format, comprising:
- a communications device disposed to receive audible communications from the ATC;
- a processor disposed to convert audible communications received by the communications device into textual format;
- a display screen functionally coupled to the processor and disposed to display text corresponding to the audible communications received by the communications device; and,
- a functionality of displaying prompts which offer selections for controlling selection of incoming ATC system information for displaying, including one option to display all ATC system messages, and a second option to restrict displayed incoming ATC system information to that directed to a designated call sign, and a third option to enter a call sign as the designated call sign.

* * * * *